May 12, 1936.  H. S. JANDUS  2,040,176
END CONNECTION FOR BUMPER BARS
Filed April 27, 1931   4 Sheets-Sheet 1

Inventor
Herbert S. Jandus.
by Charles Hill
Attys.

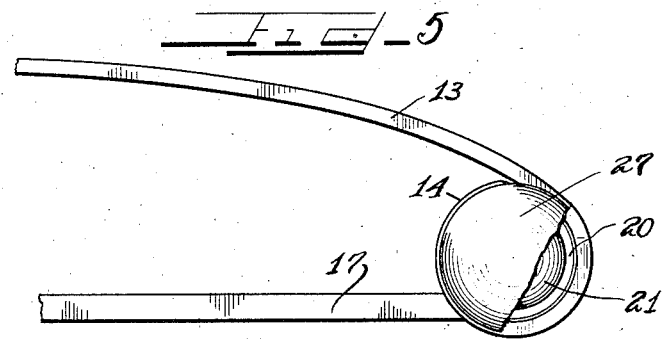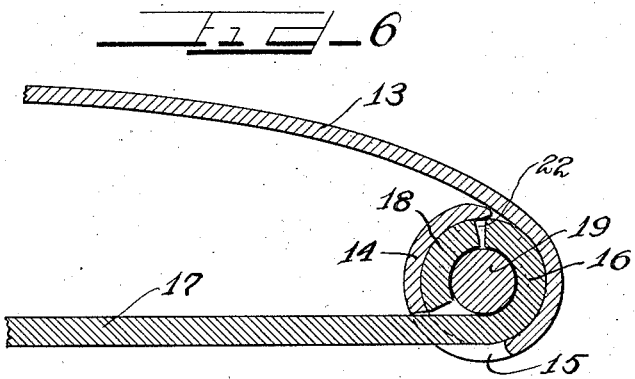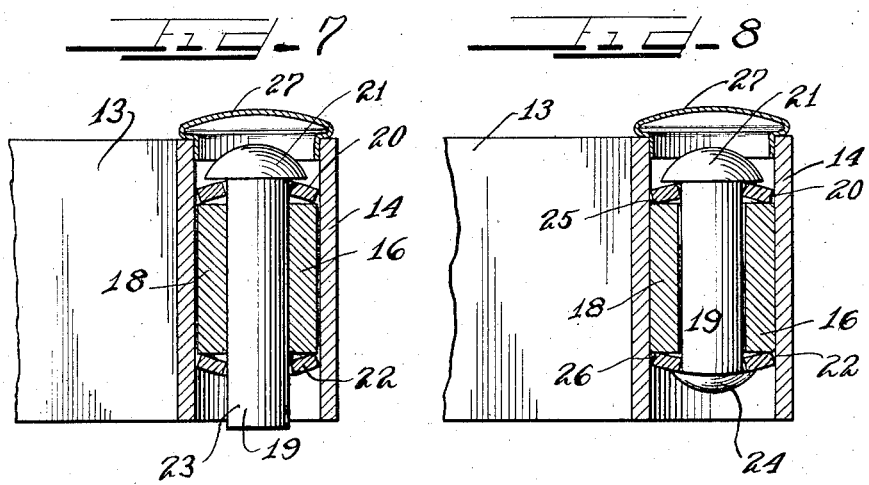

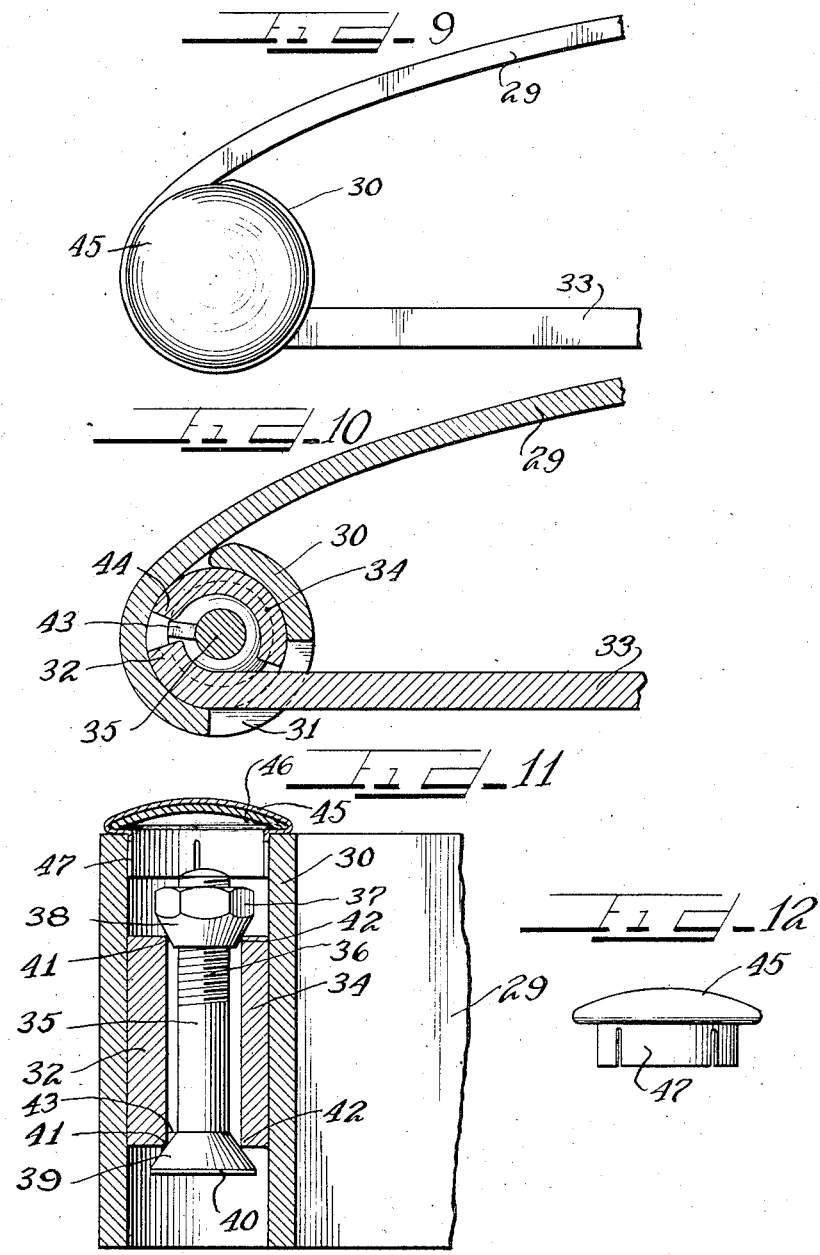

May 12, 1936.  H. S. JANDUS  2,040,176
END CONNECTION FOR BUMPER BARS
Filed April 27, 1931  4 Sheets—Sheet 4
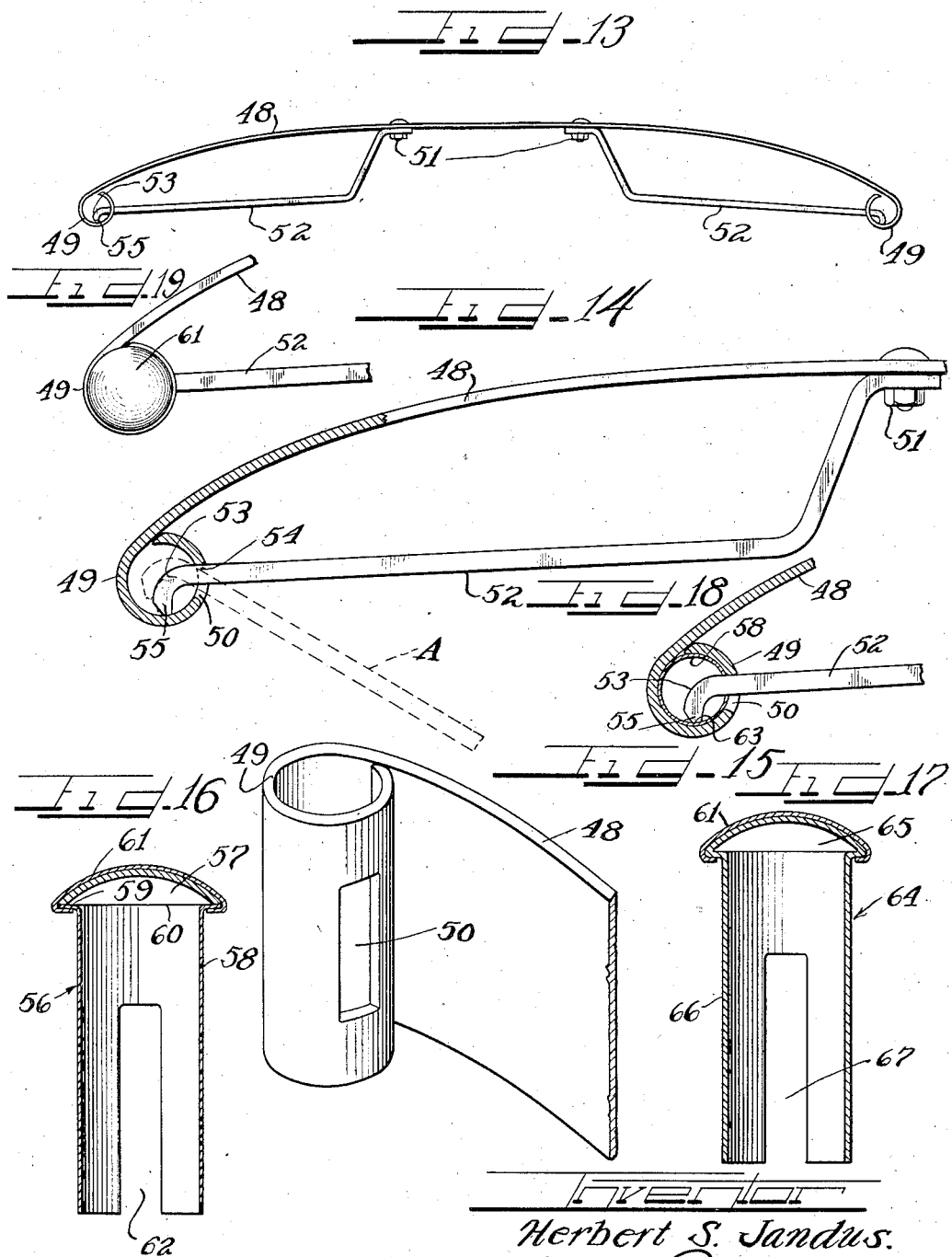
Inventor
Herbert S. Jandus.
by Charles Hills
Attys.

Patented May 12, 1936

2,040,176

UNITED STATES PATENT OFFICE 2,040,176

END CONNECTION FOR BUMPER BARS

Herbert S. Jandus, Detroit, Mich., assignor to General Spring Bumper Corporation, a corporation of Michigan Application April 27, 1931, Serial No. 533,059

17 Claims. (Cl. 293—55)

This invention has to do with bumpers and has for one of its objects the provision in a bumper construction of an end connection which is of neat appearance, is compact, will inhibit rattling and afford proper centering, involves a minimum time for assembly, and may be made at a low cost.

Generally speaking, the invention contemplates the provision of a bumper end connection involving preferably a bumper of the single impact bar type, wherein one bar is provided with incomplete eyes entered through openings in the eyes of the other bar, peculiar construction being made use of to prevent accidental separation of the bars and hold them firmly together and prevent loss of the end caps.

Another object resides in the provision of special end cap construction for cooperation with each bumper end connection.

Other and further important objects and advantages of this invention will be apparent from the disclosure in the specification and the accompanying drawings.

The various embodiments of the invention (in preferred forms) are illustrated in the drawings and hereinafter more fully described.

On the drawings:

Figure 5 is a fragmentary plan view of a bumper end connection constructed in accordance with another form of the present invention.

Figure 6 is a fragmentary sectional view of the same.

Figure 7 is a fragmentary sectional view of the same, partly in elevation, taken at approximately right angles to the view shown in Figure 6, showing the parts assembled just prior to the clinching of the rivet.

Figure 8 is a view similar to Figure 7 but showing the bumper end connection as it appears when the assembly is complete.

Figure 9 is a plan view showing another improved bumper end construction made in accordance with the present invention.

Figure 10 is a horizontal sectional view of the improved bumper end connection.

Figure 11 is a vertical sectional view of the same, certain parts being shown in elevation.

Figure 12 is an elevational view of a stamped cap for concealing and protecting the constituent parts of the connection.

Figure 13 is a plan view of a bumper constructed in accordance with a further form of the invention.

Figure 14 is an enlarged plan view of a portion of the bumper, partly in section.

Figure 15 is an enlarged perspective view of the bumper eye construction.

Figures 16 and 17 show two forms of end cap construction for use with my improved bumper end connection.

Figure 18 is a sectional view showing how the end cap is retained in position by the bumper bars.

Figure 19 is a plan view of the same.

Figure 1:
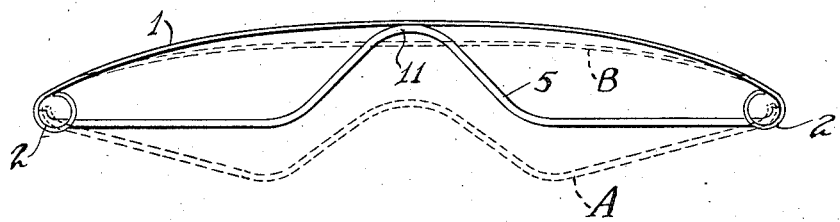
Figure 1 is a diagrammatic plan view showing in full lines a complete bumper construction built in accordance with one form of the present invention, and showing in dotted lines the manner in which the parts are assembled.
Figure 2:
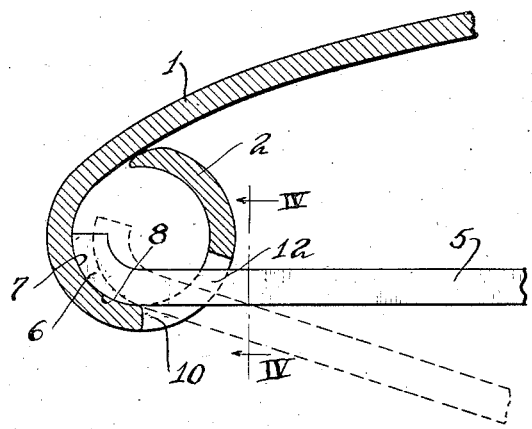
Figure 2 is a fragmentary sectional plan view showing in full lines the arrangement of the bars when assembled for use, and in dotted lines the position of an end of the back bar as the latter is being inserted to final position, the back bar being shown in elevation.
Figures 3, 4:
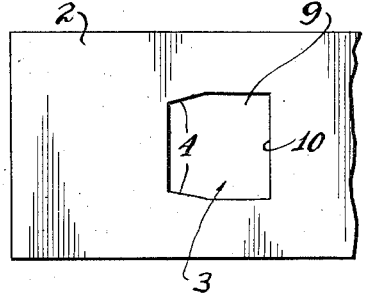
Figure 3 is a development, taken from the rear of the portion of the impact bar forming an eye, prior to the formation of such eye, to illustrate the opening through which the back bar is passed during assembly of the bars.
Figure 4 is a fragmentary sectional view taken approximately in the plane indicated by the line IV—IV in Figure 2.

Referring now more particularly to the drawings, wherein the same parts are indicated throughout by the same reference characters, the front or impact bar 1 is provided with oppositely disposed eyes 2 having openings 3, the latter having converging walls as at 4. A back bar 5 has its extremities curved at 6 to conform with the curvature of the eyes 2, the eyes and said extremities thus providing coengaging arcuate bearing surfaces 7 and 8, respectively.

When it is desired to assemble the bars 1 and 5, the bar 5 is flexed to bring its curved extremities 6 sufficient inward of their normal positions to afford their entry into the eyes 2 through the openings 3. The dotted lines A show the condition of the bar 5 just subsequent to insertion of its ends. It will be noted that the wide portion 9 of each opening 3 is of such dimensions as to easily admit the ends 6 of the back bar 5. It will be understood, of course, that the extremities 6 of the back bar 5 may be inserted in the openings 3 simultaneously, or one may be inserted first and then the other. The insertion of the extremity 6 may be facilitated by also flexing the front or impact bar 1 to substantially the position shown in dotted lines at B, since, by reason of the substantially curved shape of the bar 1, such flexure of this bar will result in somewhat increasing the distance between the remote walls 10 of the openings 3.

Once the ends 6 are disposed in the eyes 2, the back bar 5 is released, whereupon it assumes the position shown in full lines in Figure 1 with its reinforcing or cushioning portion 11 in engagement with the bar 1, with the result that the portions 12 of the back bar 5 will be sprung into wedging engagement with the converging walls 4 of the openings 3. With the parts thus engaged, it will be clear that the bars are adequately connected together for slight pivotal movement at their ends and further in such a manner that rattling of the parts cannot occur.

Figure 20:
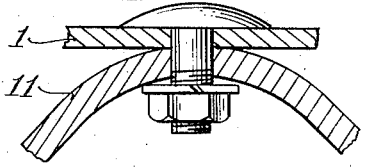
Figure 20 is a fragmentary plan view showing clamping means for the front and back bars.

Suitable clamping means 11a, as shown in Figure 20, may be employed for holding the cushioning portion 11 of the back bar 5 and the corresponding portion of the front bar 1 together. It will be understood, of course, that the back bar may be made in two pieces which may be individually coupled with the eyes of the front bar to thereby further facilitate assembly, and the opposite ends of these pieces may overlap and be secured together and to the adjacent portion of the front bar by a suitable clamp or bolt. Furthermore, if desired, short cushion bars could be used with two separate clamps to hold their respective ends securely to the front bar.

The various parts are preferably so dimensioned that it will be impossible for interconnected ends of the bars to be separated, for all practical purposes, during use of the same on a vehicle or the like.

In the form of the invention appearing in Figures 5 to 8, inclusive, the front or impact bar 13 is provided with end eyes 14, only one being shown for the purpose of illustration. Each eye 14 is provided with an opening or window 15 to provide a means of ingress to the interior of the eye 14, of the semi-eye 16 of the back bar 17. In end connections of this character heretofore in vogue, it has been common to make the inside eye of the connection complete, that is, approximately 360°, with the idea of having the contacting walls of the respective eyes firmly in engagement. It frequently occurs, however, that in the act of manufacturing the eyes the latter are improperly dimensioned when ready for assembly, with the result that either the eyes cannot be assembled without considerable difficulty or they are too loose so that rattling will inevitably occur. It is principally to overcome this difficulty without resorting to the expense of accurate machine work that the present invention has been devised.

To this end, what amounts to in effect a composite or multi-part eye construction, preferably for the back bar, is produced. The back bar eye in its entirety thus consists of the semi-eye 16 and a filler member or bearing element 18. The filler 18 is preferably in the form of an arc of a circle having corresponding radial dimensions with the semi-eye 16. A rivet 19, bolt or the like is disposed in the central opening between the portions 16 and 18 of the back bar eye, a normally dished spring washer 20 or the like being positioned between the rivet head 21 and the upper surfaces of the eye portions 16 and 18. A second washer 22 is placed in a position with respect to the lower surfaces of the back bar eye portions 16 and 18 corresponding to the position occupied by the upper washer 20. With the parts thus arranged, the adjacent end 23 of the rivet 19 is clinched to form a head 24 which is spaced from the head 21 a distance less than the normal distance between the upper and lower surfaces respectively of the washers 20 and 22 when arranged as seen in Figure 7. The result is that the biting edges 25 and 26 of the respective washers are expanded and forced into biting engagement with the upper and lower surfaces of the respective eye portions 16 and 18 of the back bar, so that said portions are forced into tight gripping engagement with the interior walls of the front bar eye 2.

It will be understood, of course, that the filler member 18 will preferably be made of standard size for a given bumper size, and will preferably be made of such dimensions that a loose fit prior to clinching of the rivets will be assured, even though the eye 14 and the eye portion 16 may not be perfectly dimensioned. This will provide for a firm and tight engagement of the various parts constituting each end connection of the bumper. To conceal each eye and provide a finish to the end connection, a suitable stamped cap may be inserted in the upper exposed end of the eye as shown at 27, and, if desired, in the lower end of each eye.

It will be seen from the foregoing that this bumper end connection construction is marked by extreme simplicity of assembly and construction and neat appearance, and is sufficiently sturdy to withstand stresses to which bumpers are subject when in use, and further incorporates means whereby rattling between the various parts is eliminated. It will be noted that the opening 15 is preferably substantially rectangular to afford ease of entry of the portion 16 into the eye 14. The radial pressure of the portions 16 and 18 of the back bar eye against the eye 14, caused by the clinching of the rivet 19 as above explained, is sufficient to prevent rattling between the portion of the rear bar which is disposed in the opening 15, and the walls of said opening.

In order to assemble the parts of each connection, the rear bar eye portion 16 is first inserted in the eye 14 through the opening 15, and then the filler member or block 18 is located in the eye in substantially the relation shown in Figure 6. The rivet 19, with a washer 20 disposed adjacent its head 21, is then inserted axially into the eye 14 between the portions 16 and 18, after which the second washer 22 is placed as shown in Figure 7. With the parts thus arranged, the bottom 23 on the rivet 19 is clinched to form the head 24, the washers 20 and 22 being thereby somewhat flattened as described hereinabove. The cap 27 is so made as to have a fairly tight fit in the eye 14 and is placed in the position shown on the drawings.

The bars may be of resilient metal or the like and may be of any desired construction. It will be appreciated from the foregoing that with this invention it is not necessary that the rivet 19, bolt or the like be perfectly centered.

The form depicted in Figures 9 to 12, inclusive, comprises a front or impact bar 29 provided with oppositely disposed eyes 30, only one being shown as sufficient for the purpose of illustration. Each eye 30 is provided with a window or opening 31 which affords access of the curved end 32 of the back or rear bar 33. The bars 29 and 33 are preferably of resilient metallic construction, and each end 32 of the bumper bar 33 may be inserted in the eye 30 without the exertion of any particular amount of force on the part of the assembly-man as in the case of bumpers one or more of whose bars are made in sections, or the portion 32 may be sprung into the eye 30 and normally maintained therein by the resilience of the bar.

In order to prevent undesired separation of the ends of the bars 29 and 33, a complemental eye member or bearing portion 34, forming with the curved end portion 32 a substantially complete inner eye, is located in the eye 30 in juxtaposed relation to the portion 32. A plow bolt 35 has its threaded shank 36 located between the portions 32 and 34 of the inner eye, and receives a nut 37 whose tapered shoulder 38 cooperates with the tapered shoulder 39 of the bolt head 40 to engage the respective inner edges 41 and 42 of the portions 32 and 34 and wedges them apart into rigid engagement with the inner wall of the eye 30. The bolt head 40 is provided with a lug 43 which serves to space the end portion 32 of the rear bar 33 from the juxtaposed end 44 of the eye portion 34. The portion 34 may be of thinner material than the back bar 33, or may be otherwise formed, the particular formation, within reasonable limits, of course, being immaterial insofar as the successful connection of the parts is concerned, since the tapered head and nut of this assembly will equalize the threading force and permit the bolt shank to find its own position. A cap formed of sheet stamped metal or otherwise and indicated at 45 is reinforced at 46 and has a resilient shank 47 which is disposed in and firmly grips the eye 30, thereby completely concealing the eye. A second cap may be correspondingly located at the other end of the eye.

It will be obvious from the foregoing that this bumper end connection lends itself to ease of assembly and disassembly, involving a minimum of parts which are either of standard construction or easily made, no part of which projects beyond the confines of the bumper bars, and the various parts of which are completely concealed from view, thereby presenting a very neat appearance. The bolts provide the plural function of preventing separation of the bumper bars and of firmly maintaining the same in rigid interengagement, thereby preventing rattling. The parts are moreover so related as to admit a minimum of dust and grit, so that proper wedging action is assured at all times.

In the form illustrated in Figures 13, 14 and 15, the bumper construction includes a front bumper bar 48 having eyes 49, each eye having a window or opening 50. The back bar construction may be of the character involving a pair of elements overlapping centrally and thus connected to the front bar by a center clamp, or the corresponding ends of the rear bar element may be in spaced relationship as shown and individually connected to the front bar by a clamp 51 as shown. Each back bar portion 52 has a curved end 53 which is passed into the eye 49 through the opening 50 in the manner indicated by the dotted lines at A.

The opening 50 is substantially rectangular, and is of such dimensions as to just allow the end 53 of the bar 52 to enter the eye 49. Once the end 53 is in the eye 49, the bar portion 52 is turned to the position shown in full lines and clamped at 51, the parts being so formed that this action requires a certain degree of pressure, thus causing the portion 54 adjacent the end 53, and the extremity 55 of the end 53 to purchase with considerable pressure against the forward wall of the opening 50 and the interior of the eye 49 respectively. The rear bar portion 52 thus effectively constitutes a cushioning member and is thus so constructed that it cannot be accidentally removed from the impact bar eye.

It may be desirable to employ an end cap for concealing the end 53 of the bar 52 and thereby enhance the appearance of the bumper as a whole. To this end, I have devised certain end cap constructions, of which the two appearing in Figures 16 and 17 are illustrative.

The cap 56 shown in Fig. 16, comprises a head portion 57, and a bearing shell portion 58 having a lateral flange 59 engageable with the rim 60 of the head portion 57. The two portions are permanently held together by a cover 61 of stainless steel or other similar material. The head portion reinforces the cover. The head portion and cover may of course be spherical as shown, or otherwise. The shell 58 has an opening or slot 62 which is adapted to be alined with the eye opening 50 to admit the back bar end 53. When the back bar is secured to the impact bar, the extremity 55 of the end 53 engages the shell 58 at 63 with considerable pressure which is exerted at all times, thereby securely retaining the cap against loss or unauthorized removal.

The cap 64 has its head 65 and bearing shell 66 integral, the shell being slotted at 67, and is in all other respects, substantially identical with the cap 56. With this construction, the cover 61 may be dispensed with and the head 65 plated with chromium or made of stainless steel for ornamental purposes.

It will thus be seen that the cap not only conceals the back bar end 53 from above, but, as shown in Fig. 18, the shell embraces the bar end 53 within the eye 49 and thus conceals the end 53 and prevents entry of rain and the like laterally.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. Bumper construction including a bar having eyes, said eyes having openings provided with upper and lower converging walls, a second bar having end portions of a width in excess of the minimum distance between said walls, but capable of insertion into said eyes through the wider portions of said openings, said end portions being in firm wedging engagement with said walls when the bars are assembled with said end portions disposed in said eyes.

2. Bumper construction including a bar having eyes, said eyes having openings provided with upper and lower converging walls, a second bar having end portions of a width in excess of the minimum distance between said walls, but capable of insertion into said eyes through the wider portions of said openings, said end portions being in firm wedging resilient engagement with said walls when the bars are assembled with said end portions disposed in said eyes.

3. Bumper construction including a bar having eyes, said eyes having openings provided with upper and lower converging walls, a second bar having end portions of a width in excess of the minimum distance between said walls, but capable of insertion into said eyes through the wider portions of said openings, said end portions being in firm wedging engagement with said walls and engaging the interiors of said eyes outwardly beyond said walls when the bars are assembled with said end portions disposed in said eyes.

4. An end connection for bumpers, comprising a bumper bar having an eye portion, another bumper bar having an eye provided with a lateral opening of a width less than the inside diameter of said eye and affording access of said eye portion into said eye, a second eye portion forming with the first eye portion a substantially complete eye for the first bar, and means for holding said portions in tight engagement with the first eye, whereby the bars are assembled to pivot about the axis of said first eye.

5. An end connection for bumpers, comprising a bumper bar having an eye portion, another bumper bar having an eye provided with a lateral opening of a width less than the inside diameter of said eye and affording access of said eye portion into said eye, a second eye portion forming with the first eye portion a substantially complete eye for the first bar, and means for holding said portions in tight engagement with the first eye, whereby the bars are assembled to pivot about the axis of said first eye, said means including a member providing shoulders, and resilient means under pressure and spacing said shoulders from said portions.

6. Bumper end construction comprising an impact bar provided with an eye having an opening, a cushion bar having an end portion passing through said opening and disposed in said eye, means connecting said cushion bar to said impact bar, said end portion being curved rearwardly to prevent its accidental removal from said eye, and an end cap comprising a shell fitting in said eye and having an opening substantially registering with the opening in said eye, said means firmly holding said end portion against said shell at all times, whereby to retain said shell in said eye.

7. Bumper construction including a bar having eyes, said eyes having openings provided with converging walls, and a second bar having end portions of a width in excess of the minimum distance between said walls, but capable of insertion into said eyes through the wider portions of said openings, said end portions being in firm wedging engagement with said walls when the bars are assembled with said end portions disposed in said eyes.

8. Bumper construction including a bar having eyes, said eyes having openings provided with converging walls, and a second bar having end portions of a width in excess of the minimum distance between said walls, but capable of insertion into said eyes through the wider portions of said openings, said end portions being in firm wedging resilient engagement with said walls when the bars are assembled with said end portions disposed in said eyes.

9. Bumper construction including a bar having eyes, said eyes having openings provided with converging walls, a second bar having end portions of a width in excess of the minimum distance between said walls, but capable of insertion into said eyes through the wider portions of said openings, said end portions being in firm wedging engagement with said walls when the bars are assembled with said end portions disposed in said eyes, the distance between the wide ends of said openings being less than the normal overall length of the second bar whereby said end portions extend beyond said wider ends of said openings when said end portions are disposed in said eyes.

10. An end connection for bumpers comprising a bumper bar having an eye portion, another bumper bar having an eye provided with a lateral opening affording access of said eye portion into said eye, a second eye portion forming with the first eye portion a substantially complete eye for the first bar, means including a shoulder spaced from said portions for holding the eyes of said bars in assembled relation, and resilient means disposed between said shoulder and said portions for holding the latter in engagement with the eye of the other bumper bar.

11. An end connection for bumpers, comprising a bumper bar having an eye portion, another bumper bar having an eye provided with a lateral opening affording access of said eye portion into said eye, a second eye portion forming with the first eye portion a substantially complete eye for the first bar, and means spaced from the eye of the other bumper bar for holding said portions in tight engagement with said first eye.

12. An end connection for bumpers, comprising eyes arranged one within the other, one of said eyes comprising relatively movable portions, and resilient means for moving said portions apart and into tight engagement with the other eye.

13. Bumper construction comprising a bumper bar having an eye provided with an opening, a cushion bar therefor having an end portion of less width than said opening, and extending through said opening into said eye, a bearing shell in said eye and slidably turnable with said portion to insure proper pivoting of said cushion bar relative to said eye, and means holding spaced parts of said portion in firm engagement with spaced parts of said eye and shell.

14. Bumper end construction comprising a bar provided with an integral eye having an opening closed at its upper and lower ends, a second bar having an end portion provided with an offset of less width than said opening so as to pass therethrough and be positioned within said eye, and bearing means disposed interiorly of said eye and between said offset and a part of said eye to enable said offset to properly pivot in said eye.

15. In a bumper, an impact bar having a rearwardly disposed end eye provided with an opening, a support structure including a part projecting laterally through said opening and a part disposed in said eye and arranged to exert a rearward pressure on said eye, the first part being arranged to exert a forward pressure on the eye in said opening farther inward than the second part from the outer extremity of said end, and means so connecting said impact bar and first part at a point farther than said opening from said extremity as to cause said pressures to form a couple tensioning the eye when the bumper is assembled.

16. In a bumper, an impact bar formed with end eyes provided with lateral openings, support structure including outwardly extending parts passing through said openings and other parts adjacent the first parts, said other parts being arranged to exert rearward pressure on said eyes, said first parts being arranged to exert forward pressure on the eyes in said openings, and means so securing said support structure to the impact bar intermediate the ends of the impact bar as to cause said pressures to be exerted when the bumper is assembled.

17. In a bumper, an impact bar having an end thereof coiled rearwardly and inwardly upon itself to provide a substantially closed eye and having a window opening, a support structure including a part projecting through said opening and arranged to exert pressure in said opening on said eye and another part arranged to exert pressure on the eye so as to form a couple with the first pressure in a direction tending to coil the eye, and means securing said impact bar and first part together so that said pressures are exerted when the bumper is assembled.

HERBERT S. JANDUS.